Patented Mar. 26, 1935

1,995,539

UNITED STATES PATENT OFFICE 1,995,539

DENATURED ETHYL ESTERS

William H. Hampton, Berkeley, Calif., assignor to Standard Oil Company of California, San Francisco, Calif., a corporation of Delaware No Drawing. Original application January 12, 1931, Serial No. 508,369. Divided and this application August 20, 1934, Serial No. 740,643

9 Claims. (Cl. 202—77)

This invention relates to ethyl esters, such as ethyl acetate, ethyl formate, and ethyl propionate, and refers particularly to ethyl esters having a denaturant in which the denaturing material is derived from acid sludges resulting from the treatment of petroleum and like oils with sulphuric acid.

This application is a division of my co-pending application, Serial No. 508,369, filed January 12, 1931.

In the manufacture of ethyl esters, it is necessary to incorporate in the ethyl ester certain denaturing materials which will render any alcohol produced therefrom unfit for use as an intoxicating beverage. If the ethyl ester has such a denaturing material, it is free of tax. In a very limited number of cases the denaturing materials are such as to allow the sale or use of the esters without permit or bond.

The present invention embodies the discovery that certain oils or parts of oils which are derived from acid sludges resulting from the treatment of petroleum and like oils with sulphuric acid possess certain excellent and exceptional properties when used as a material for denaturing ethyl esters. Upon addition of this compound or series of compounds to an ethyl ester, any alcohol derived therefrom has such a taste and odor as to definitely and positively deter the most incorrigible or ambitious from its consumption as a beverage, even after extreme dilution; nor will flavoring materials, such as the essential oils, etc., which might be added in an attempt to mask or minimize the taste and odor so imparted, act to render the alcohol derived from such esters, upon hydrolysis, palatable or fit for beverage purposes. As will be brought out below, the denaturing material may be subjected to a purification or refinement before its admixture with ethyl ester, whereby certain of the odor imparting constituents may be decreased in amount and there remain principally, as deterrents to consumption, the taste-imparting constituents. By this means the usefulness of the material is enlarged in scope to render it acceptable in certain arts and industries in which the more disagreeable odor might be prohibitive. It should be stated that the decrease in amount of these odor imparting constituents does not in any sense render the alcohol derived from the ethyl ester palatable or acceptable for beverage purposes, inasmuch as the principal deterrent effect is brought about by the violation of the sense of taste, and is merely augmented by that of odor.

It has been found very difficult, or impossible, to adequately describe the taste imparted by this material in terms such that it may be recognized. The taste and odor of the compounds comprising it are sufficiently beyond the normal experience as to require new words, new phrases, in the vocabularies even of the chemist and the pharmacist. Suffice it to say, therefore, that these tastes and odors are distinctive and inherently characteristic of the chemical ingredients comprising the mixture. The taste imparted by this denaturant is extremely persistent. Thus, it is disagreeably noticeable, and calls itself forcibly upon the attention, for a period of hours subsequent to its imbibition.

This material, once added to an ethyl ester, in whatever proportions or amounts consistent with its purpose, is difficult or impossible to remove either from the ester, itself, or the alcohol derived therefrom. It consists of a series of chemical compounds whose boiling points may extend from below that of the constant boiling alcohol-water mixture to any desired point above it. This boiling point range may be varied at will, and is subject to close control and duplication during its process of manufacture and refinement. Thus, the material can not be removed, either from the ester or the alcohol derived therefrom, by the ordinary process of fractionation or rectification.

Chemically, it is very inert. Thus, no substantial removal may be effected upon refluxing alcohol with which it is associated with dilute acids or with dilute alkalis. Very strong sulphuric acid, upon such refluxing, dissolves this denaturant. It will be noted, however, that such refluxing with very strong acids, as sulphuric, effects such a reaction with the alcohol itself that dilution and distillation are necessary for its recovery and that the denaturant is freed from the acid solution simultaneously with the alcohol, and passes from such recovery system together with the recovered alcohol, and is inseparable from it.

No ordinary physical means is capable of separating this material from alcohol with which it is associated. In this connection, distillation, with fractionation or rectification, has already been mentioned. Further, the freezing points, or the temperatures at which the constituents of this material solidify, are so low that the refrigeration of the esters or the alcohol denatured by its presence does not cause its separation as solid or semi-solid matter capable of removal by settling and decantation, or filtration, or by clarification, as by centrifuging, etc. Further, a large amount of this denaturing material remains in solution even after extreme dilution of the alcohol with water. Further, while certain of the odorous constituents may be somewhat decreased in amount by the adsorbing effect of certain agents, as the actified charcoals, and gels, as silica gel, or by treatment with various clays, when such treatments or refinements are carried out before admixture with the ester, the removal of the taste-imparting constituents, which act as the principal deterrent to consumption, is by no means affected by such agents. Further, it is completely volatile, and leaves no residue upon evaporation.

In addition to these qualifications, this material is non-toxic in the amounts necessary for all ordinary denaturing purposes, although, upon the consumption of considerable quantities, it may be nauseating; nor is it irritating to the skin.

Further, but extremely small quantities or proportions are necessary to effectively denature an ethyl ester, less than 1% by volume of the preferred materials being sufficient for all ordinary purposes. When used in denaturing ethyl esters, such as ethyl formate, ethyl acetate, ethyl propionate, ethyl lactate, ethyl palmitate, etc., upon hydrolysis of the ester, the denaturing material remains in alcohol solution and is not separated from the alcohol by solution in the organic acids resulting upon hydrolysis.

The foregoing description has indicated the qualifications and wide utility of this denaturing material. The following descriptions set forth the several methods of its manufacture, and describe more definitely its chemical and physical characteristics.

The material comprising this denaturant is derived from the sludges resulting upon the treatment of petroleum and like oils with sulphuric acid, whenever such treatment removes measureable amounts of the sulphur bodies originally contained in the said petroleum and like oils, and consists in the oily components, or parts of the oily components, of the said sludges after their separation from the acids. The peculiar value as alcohol denaturants of the oily components, or parts of the oily components, of the said sludges, resides principally in their content of organic sulphur bodies, and any sludge or acid extract which upon hydrolysis or distillation yields an oil containing such organic sulphur bodies is a proper source for the manufacture or preparation of the denaturing material described herein.

Petroleum and like oils, as for example the shale oils and coal tars, or their various distillates, or the distillates produced by the pyrogenic conversion of higher-boiling fractions or residues to lower-boiling fractions, as in the so-called "cracking" operations, are commonly subjected to treatment with sulphuric acid before their marketing of their commercial or domestic utilization. The sulphuric acid treatment to which they are so subjected varies widely as to the amount and strength of the acid used, and is determined by the character of the oil or distillate and by the refinement or purification considered necessary or desirable for the use to which the various finished products will eventually be put. In a large number of cases this treatment is designed to reduce the sulphur content of the oil. In certain other cases, it has, in addition to the purpose of sulphur reduction or removal, that of improving the so-called burning qualities of the oil, as the illuminating oils. In other cases, it may be designed to remove various unstable and easily polymerizable or oxidizable compounds or bodies, as in the treatment of certain highly cracked naphthas, or in the treatment of motor benzols derived from coal tar. In still other cases, it may be merely for the purpose of improving the color and appearance of certain oils, as in the treatment of certain straight-run gasolines, petroleum thinners, etc. But, for whatever purpose such sulphuric acid treatment be designed, it is true that in practically all cases sulphur-containing bodies or compounds are removed from the oils or distillates and pass into sulphuric acid solution or combination to a greater or less extent, depending upon the character of the oil and upon the amount and strength of the acid used, as aforesaid.

It is the practice in the industry to return these acid sludges to recover a portion of their acid content.

These processes are generally and preferably, though not invariably, hydrolyzation processes, by means of which the hydrocarbon and sulphur-containing compounds or bodies are freed from solution in or from combination with the acid, and may be separated, to a greater or less degree, from it, after which the acid may be concentrated, if necessary or desirable, for re-use. Thus, in the general and preferable cases, it is proper to speak of the hydrocarbon and sulphur-containing material so separated from the acid sludges as oils from hydrolyzed sludge, even though, in certain cases, the crude material so separated may be extremely viscous, and approach tar or asphalt in appearance and consistency. These oils recovered from the acid sludges have heretofore been commonly burned as fuel, although various attempts have been made to realize some value from certain of them as solvents, etc.

The novel denaturant described herein is preferably derived from the oily components of these acid sludges, after the separation of the oily components from the acidic components of the said sludges.

In effecting the separation of the hydrocarbon and sulphur containing compounds or constituents from the acid contained in these sludges, various processes and methods are employed, of which several will be enumerated.

Although not a preferable method, mere distillation of the sludges is sufficient to effect some separation of the oily constituents from the acid. The temperatures necessary to bring this about at atmospheric or even at reduced pressures, without dilution of the sludge with water are, however, sufficient to cause decomposition and reduction of a considerable part of the acid, and polymerization and oxidation of the oils. Thus, the oils distilled are of higher boiling point and are less in amount than when obtained by dilution and hydrolysis; also, a considerable amount of $SO_2$ and of $SO_3$ is removed during the distillation, and are condensed or recovered with the oils. Moreover, the acid remaining in the still is seriously contaminated with carbonaceous material, both soluble and insoluble in it, which brings about further decomposition or reduction and loss of acid upon its further concentration for re-use. For these reasons, it is preferred to dilute most of the sludges with water, and to effect what may properly be called a hydrolysis of the sludge. Some sludges may be hydrolyzed by the mere addition of water, without the application of external heat; others, however, require heat. Some sludges, for proper hydrolysis, require heating above the boiling point of the acid produced, thus necessitating the use of closed systems and pressures above atmospheric, in order that the desired temperatures may be reached. In all of these methods or variations of the hydrolyzation of the sludges the acid and tar or oil are caused to separate into two layers and may be recovered separately. The upper or oily layer constitutes the source of the preferred denaturant described herein, the denaturing material being purified or refined, if necessary, as will be described below.

In addition to the petroleum oils and distillates, shale oils or their distillates are commonly subjected to treatment or refinement with sulphuric acid, as are also certain of the more volatile coal tar distillates, such as those used for the manufacture of motor benzols, and solvents and thinners: the sludges resulting from such acid treatments constitute a further source of the denaturing material described herein. In the case of these oils it is customary to precede the ordinary treatment with relatively strong acid by a treatment with a caustic alkali and with relatively weak acid, as 50 per cent or less $H_2SO_4$: by these means the removal of the comparatively large amounts of phenols and of nitrogen bases present in these oils are substantially completely effected, without, however, the removal of a substantial amount of the organic sulphur compounds; without the prior weak acid wash the ordinary sulphuric acid treatment removes the nitrogen bases from the oils. Upon hydrolysis of the resulting sludges these nitrogen bases ordinarily remain in the acid layer, and do not to any substantial extent pass into the tar or oil layer. Their presence in the acid layer, however, lowers its value for re-concentration and re-use. The small quantities of the nitrogen-containing bodies that do appear in solution in the oil impart a characteristic and pungent odor to the denaturing material derived from it. This may be removed, if desirable, by further washing of the denaturant with weak acid solutions.

Thus, the sources of this denaturant are several and various, and, since variable amounts and strengths of sulphuric acid may be used upon a single oil or distillate, as determined by the use to which the said oil, after refinement, may ultimately be put; and since various oils and distillates may be subjected to such variable treatments, it will be seen and appreciated that the acid sludges and extracts resulting from such treatments, and the oils separated from these sludges and extracts during the recovery of the acid from them, will be widely variable in their physical characteristics and in the amounts and proportions of their chemical constituents. It may be well to note in passing, however, that if a denaturant of more or less or even of exactly similar qualities and characteristics is desired, from time to time, or if denaturing materials of different qualities and characteristics are necessary or desirable, for different purposes, or for use in various of the arts and industries, these requirements may be perfectly met in each case; on the one hand, similar acid treatments, carried out on similar oils or distillates, will produce similar sludges, and these sludges, upon separation of their acidic and their non-acidic components, will produce oils from which similar or identical materials, for use as denaturants, may be produced; on the other hand, dissimilar materials for use as denaturants of ethyl esters, which may be used for widely different purposes, may be produced from the sludges or extracts resulting from the use of different amounts of acid upon the same oil or distillate, or from the use of the same amounts of different strengths of acid upon the same oil or distillate, or from the use of the same amount and of the same strength of acid upon oils or distillates of different sources or of different boiling point ranges, or of different sulphur contents, etc.

The utility of these oils, separated from the acid sludges or extracts as described above, as denaturing materials or as materials from which denaturants may be produced is dependent upon the inherent chemical characteristics and qualities of certain of their components, notably the large proportions of organic sulphur compounds contained in them. While most of these organic sulphur compounds are believed to be organic sulphides of the cyclic type, other organic sulphur compounds may be present, such as aliphatic sulphides, disulphides, polysulphides, mercaptans and thiophene homologs. The proportion of each of these several series, or of the individual members within any one of the several series, can not be set down, for two reasons: No known physical or chemical methods have thus far been worked out which serve to identify precisely the individual constituents of such complex mixtures, except in a very few of the simple cases, as, for example, the lower mercaptans. Further, the proportions of the several series of compounds or of the individual members of any series will obviously vary widely as a result of the nature of the original treatment upon the oils or distillates. It will be sufficient to note, therefore, that these oils are all characterized by the presence of relatively large amounts of organic sulphur bodies, and that the qualifications possessed by the denaturing material derived from the sludges and extracts herein described reside largely in the inherent chemical and physical characteristics of these sulphur bodies.

In addition to these sulphur compounds there may also be present hydrocarbon bodies, either soluble as such in the acid, upon the original acid treatment of the petroleum or like distillates, which are liberated as oils upon separation of the acid by hydrolysis of distillation; or as polymerization products; or by mere entrainment in the sludge during the treatment, etc. Various hydrated products, particularly alcohols and aldehydes, may also in certain cases be present, resulting upon the treatment of those oils or distillates containing considerable quantities of unsaturated or olefinic hydrocarbons, such as the "cracked" or pressure distillates.

In most cases, it has been found desirable to subject these oils to a refinement or purification before their use as denaturants. As has already been pointed out, certain of them may resemble tars or asphalt in their appearance and consistency. In these cases, it is preferable to subject the material to a distillation by any of the well-known methods by which the lower-boiling or other desirable constituents may be removed and condensed. Obviously, such lower boiling constituents are more widely useful as a denaturant than would be the crude higher boiling material. Obviously, too, the separation of these desired constituents may be brought about by fractional distillation and condensation during the continuous retorting of the acid sludges. Thus, the boiling range of the denaturing material may be controlled at will, and may be kept constant or allowed to vary, as required. It is apparent that the yield of suitable material for ester denaturants will be relatively low when derived from sludges resulting upon acid treatments of the heavier or high-boiling oils, and higher when derived from sludges upon acid treatments upon the lighter or low-boiling oils or distillates, as the gasolines, naphthas and kerosenes. In addition, the sulphur content of the oils derived from these latter sludges is generally higher than that of the oils derived from treatments upon the heavier oils. It is apparent also that those acid treatments removing the greatest amounts of organic sulphur-containing materials will produce sludges which upon hydrolysis or distillation yield more potent denaturants than those in which the sulphur removal is but little. For these several reasons the oils obtained from the hydrolysis of the gasoline, naphtha and kerosene sludges constitute the preferred source of this novel denaturing material.

Inasmuch as this material has been separated from acid, it is usually necessary to neutralize with an alkali or base the mineral acids, as sulphuric or sulphurous, which may be present at the time of separation; if desirable, such a neutralization may economically be preceded by extraction of a large amount of the mineral acids with water. Thus, the possible corrosion of lines and containers, etc., and the possible future deterioration of the oils, is stopped.

If a denaturant with but relatively little odor is desired, in which the taste-imparting constituents only comprise its desirable qualities, certain other treatments or processes of refinement may be carried out. Of the sulphur compounds contained in this material, those which possess the strongest and foulest odors are the mercaptans. Certain of the lower-boiling members of this series may be removed by treatment with caustic alkalis. Substantially all of the mercaptans, and consequently a considerable proportion of the foulest odorous principles, may be removed by adsorption upon contacting with various adsorbing agents, as silica gel, the actified charcoals, certain of the contact clays, etc., or by conversion of the mercaptans to disulphides, as by way of the well-known methods of "doctor" treatment. Methods of refinement, such as these, have no appreciable effect upon most of the taste-imparting constituents of the denaturing material, since the taste-imparting characteristics have been found to reside principally in those sulphur compounds inert or not reacted upon or removed during the types of treatment outlined above.

The color of the denaturing materials, after suitable separation and recovery of the lower-boiling fractions, is from a light straw to a dark brown; if desirable, the color may be improved by treatment with any of the usual decolorizing agents, as for example the contact clays.

For example, the sulphur content of these denaturants may be from as low as 2 per cent to as high as 30 per cent. Ordinarily, the per cent sulphur will not be above about 18 per cent, and satisfactory denaturants may be found containing only from 2 to 5 per cent sulphur. Again, it may be desirable for some purpose to dilute the denaturing material itself, before addition to the ester, with neutral substances, such as gasoline or other relatively light refined oils.

The following examples, therefore, will be understood to be merely specific, and in no sense representative or typical of the entire range of suitable denaturing materials. As has been brought out above, material suitable for use as denaturants may be derived from any of the sludges or extracts resulting upon the treatment of petroleum and like oils or distillates with sulphuric acids, whenever such treatment produces a sludge which, upon hydrolysis or distillation, yields an oil containing an appreciable content of organic sulphur compounds, and this specification should be so construed.

Particular examples of the production of the denaturing materials described herein are set forth below.

Example 1

| Acid treatment of oils | Calif. straight run gasoline | $SO_2$-treated lamp oil distillate |
|---|---|---|
| Sulphur in crude distillate | 0.06% | 0.045% |
| Sulphur in treated distillate | .03% | .02% |
| Strength acid used, $H_2SO_4$ | 98.0% | 103.4% |
| Amount acid used, lbs/gal. oil | 0.015 | .075 |
| Amount sludge produced, gals/lb. acid | .125 | .10 |

Hydrolysis of sludge

A mixture of equal parts of the above sludges was hydrolyzed in a continuous retort at 290° F. and under 20 pounds gauge pressure. A total acid tar yield of 45 per cent, on the basis of the sludge charged, was obtained. From the acid tar a yield of 25.5 per cent of denaturant was separated (or a yield of 12 per cent on the basis of the sludge retorted) having the following characteristics:

| | |
|---|---|
| Sulphur | 10.5% |
| Specific gravity | .8607 |
| A. S. T. M. dist'n st | 161° F. |
| 20 | 283° F. |
| 50 | 318° F. |
| 90 | 367° F. |
| E. P. | 413° F. |

Example 2

| Acid treatment of oils | Crude pressure naphtha | Crude kerosene distillate |
|---|---|---|
| Distillate treated | | |
| Sulphur in crude distillate | 0.43% | 0.30% |
| Sulphur in treated distillate | .35% | .06% |
| Strength acid used, $H_2SO_4$ | 98.0% | 103.4% |
| Amount acid used, lbs/gal. oil | 0.20 | 0.5 |
| Amount sludge produced, gals/lb. acid | .150 | .163 |

Hydrolysis of sludge:

These sludges, also in equal proportions, were retorted as in Example 1, but at 340° F. and under 60 pounds gage pressure. A total tar yield of 60 per cent was obtained. Of this, 14.2 per cent, or 8.5 per cent on the basis of sludges resorted was obtained as denaturant, with the following characteristics:

| | |
|---|---|
| Sulphur | 9.5% |
| Specific gravity | .8702 |
| A. S. T. M. dist'n st | 122° F. |
| 20 | 302° F. |
| 50 | 362° F. |
| 90 | 442° F. |
| E. P. | 476° F. |

Example 3

An oil similar to that obtained in Example 1 was treated with a contact clay to improve its color and to remove a part of its most malodorous constituents. The characteristics of the refined denaturant were as under 3a below. This refined material was also diluted with an approximately equal quantity of refined California kerosene. The diluted product appears as under 3b below.

|  | 3a | 3b |
| --- | --- | --- |
| Sulphur | 9.77% | 5.01% |
| Specific gravity | .8602 | .8363 |
| A. S. T. M. dist'n st | 175° F. | 227° F. |
| 20 | 280° F. | 318° F. |
| 50 | 316° F. | 365° F. |
| 90 | 359° F. | 458° F. |
| E. P. | 406° F. | 500° F. |
| Solubility in 90% alcohol | 13.5 cc. | 12.0 cc. |
| Solubility in 95%–96% H₂SO₄ | 16.5 cc. | 13.5 cc. |
| Iodine value | 45.1 | 32.9 |

The distillation range is as determined by Method 100.13, U. S. Government Master Specification, Bureau of Mines Technical Paper 323 C.

Solubility in 90% alcohol and in 95–96% H₂SO₄ is given as the volume of the respective reagents when 10 cc. is shaken with 10 cc. of the denaturant in a stoppered cylinder.

The iodine values were obtained by the standard test for fatty oils using Wij's solution.

Any or all of the foregoing denaturing materials may be added to ethyl esters for the purpose of denaturing the same. There is no very definite and quantitative method of determining exactly how much of the denaturing material is necessary, as the only means of judging its effectiveness is by the taste and other characteristics it imparts, which make the alcohol derived from the ester unsatisfactory when used in beverage mixtures, and it will be realized that a denatured alcohol sufficiently unpalatable to deter the ordinary imbiber may not be sufficient to deter the most incorrigible. It has been found that a material such as is described above as Example 3b, when used in the proportions of from one to two per cent by volume of the ester, will render the alcohol derived therefrom definitely and positively unpalatable to most individuals.

When using a denaturant such as is described above as Example 3a, approximately half the amount shown for Example 3b will be sufficient. In the denaturing of the ethyl esters, as, for example, in the case of ethyl acetate, amounts as low as one-eighth of one per cent by volume of the material described as Example 3b may be sufficient.

In practice it has been found satisfactory to use kerosene or similar material, such as coal tar distillate, containing aromatic compounds, or xylene, or a liquid sulphur dioxide extract of a petroleum oil, as a diluent when the denaturant is to be used for the denaturing of ethyl acetate or the ethyl esters in general. The presence of such a diluent, while not always necessary to the invention, has been found very convenient in practice and enables the user of the denaturant to control very precisely the amount of sulphur bodies to be added to the ester to be denatured.

While the particular denatured esters herein described are well adapted to carry out the objects of the present invention, it will be understood that various changes and modifications may be made without departing from the spirit of the invention, and the invention is of the scope set forth in the appended claims.

I claim:

1. A denatured ethyl ester containing as a denaturant organic sulphur compounds derived by the hydrolysis of acid sludge produced by the sulphuric acid treatment of petroleum oil.

2. A denatured ethyl ester containing as a denaturant organic sulphur compounds derived by the hydrolysis of acid sludge produced by the sulphuric acid treatment of petroleum oil, the denaturant being substantially free of those malodorous constituents which can be separated by passing the denaturant through a contact clay.

3. A denatured ethyl ester containing oils derived from the acid sludge formed during sulphuric acid treatment of hydrocarbon oil, said oils containing organic sulphur bodies and being substantially free of toxic bodies such as alkaloids.

4. A denatured ethyl ester including as a denaturant oils derived from acid sludges formed during the sulphuric acid treatment of petroleum oils, such denaturant containing a material content of sulphur bodies and being substantially free of toxic bodies.

5. A denatured ethyl ester containing oils derived from the acid sludge formed during the sulphuric acid treatment of hydrocarbon oil, said oils having a sulphur content of 2 to 30% and being substantially free of toxic bodies.

6. A denatured ethyl ester containing oils derived from the acid sludge formed during sulphuric acid treatment of hydrocarbon oil, said oils containing organic sulphur bodies and being substantially free of toxic bodies and having an end boiling point not appreciably above 500° F.

7. A denatured ethyl ester comprising ethyl ester and an admixture of refined volatile petroleum oil, and oils derived from the acid sludge formed during sulphuric acid treatment of hydrocarbon oil, said oils containing organic sulphur bodies and being substantially free from toxic bodies such as alkaloids.

8. A denatured ethyl ester comprising ethyl ester and an admixture of a liquid sulphur dioxide extract of a volatile petroleum oil, and oils derived from the sulphuric acid sludge formed during the sulphuric acid treatment of hydrocarbon oil, said oils containing a material amount of sulphuric bodies and being substantially free of toxic bodies.

9. A denatured ethyl ester comprising ethyl ester and an admixture of a volatile aromatic hydrocarbon, and oils derived from the acid sludge formed during the sulphuric acid treatment of hydrocarbon oil, said oils containing organic sulphur bodies and being substantially free of toxic bodies, said admixture having an end boiling point not appreciably above 500° F.

WILLIAM H. HAMPTON.